(12) United States Patent
Fowler

(10) Patent No.: US 8,478,035 B2
(45) Date of Patent: Jul. 2, 2013

(54) METHOD AND APPARATUS FOR ENGAGING FUNCTIONALITY WITH A COLOR TAG

(75) Inventor: Paul C. Fowler, Scottsdale, AZ (US)

(73) Assignee: EInstruction Corporation, Denton, TX (US)

( * ) Notice: Subject to any disclaimer, the term of this patent is extended or adjusted under 35 U.S.C. 154(b) by 639 days.

(21) Appl. No.: 12/710,007

(22) Filed: Feb. 22, 2010

(65) Prior Publication Data

US 2011/0206232 A1    Aug. 25, 2011

(51) Int. Cl.
*G06K 9/00* (2006.01)
*G06K 9/34* (2006.01)

(52) U.S. Cl.
USPC .......................................................... 382/165

(58) Field of Classification Search
USPC ............... 382/100, 162, 164, 165, 190; 705/1
See application file for complete search history.

(56) References Cited

U.S. PATENT DOCUMENTS

| 8,085,433 B2 * | 12/2011 | Arachchige et al. ........... 358/1.9 |
| 2009/0037211 A1 * | 2/2009 | McGill et al. ...................... 705/1 |
| 2010/0265525 A1 * | 10/2010 | Hagiwara ...................... 358/1.9 |
| 2011/0206232 A1 * | 8/2011 | Fowler .......................... 382/100 |

OTHER PUBLICATIONS

PCT Notification of Transmittal of the International Search Report and the Written Opinion of the International Searching Authority, or the Declaration with PCT International Search Report and Written Opinion of the International Searching Authority in International Application No. PCT/US11/22530 dated Nov. 13, 2012, 9 pages.

* cited by examiner

*Primary Examiner* — Amir Alavi
(74) *Attorney, Agent, or Firm* — Baker Botts L.L.P.

(57) ABSTRACT

A method of creating and/or detecting a color tag being displayed or to be displayed along with or as part of an image, wherein the color tag comprises an attribute or information identifying an attribute that will be communicated to an application and/or device. In one embodiment of this method, the application and/or device is capable of taking an action associated with the color tag. The method of creating a color tag further comprises associating the color tag with an image to be displayed on a display, wherein the color tag will be displayed with or as part of the image on the display. The method of detecting a color tag also comprises communicating the attribute or information identifying the attribute to the application and/or device capable of taking an action associated with the color tag.

59 Claims, 4 Drawing Sheets

METHOD AND APPARATUS FOR ENGAGING FUNCTIONALITY WITH A COLOR TAG

TECHNICAL FIELD

This invention relates generally to image recognition using potentially disparate hardware and software systems and more specifically, to a system and a method for image recognition using a color tag.

OVERVIEW

Many computer users, including teachers, attorneys, marketing professionals, and even advertisers use images to convey information to their target audience. These users may implement various hardware or software platforms to present their information that, at times, may interact with one another or other platforms. However, the platforms may not have the ability to communicate effectively to one another, which may degrade the potential value of the platforms or the effectiveness of the user's presentation of information.

SUMMARY OF EXAMPLE EMBODIMENTS

In accordance with one embodiment of the present disclosure, a method of creating a color tag and associating the color tag with an image to be displayed comprises creating a color tag comprising an attribute or information identifying an attribute that will be communicated to an application and/or device. In one embodiment of this method, the application and/or device is capable of taking an action associated with the color tag. The method further comprises associating the color tag with an image to be displayed on a display, wherein the color tag will be displayed with or as part of the image on the display.

In accordance with another embodiment of the present disclosure, a method of detecting a color tag and engaging an application and/or device as a result of the detection comprises displaying a color tag on a display, wherein the color tag comprises an attribute or information identifying an attribute that will be communicated to an application and/or device. In one embodiment of this method, the application and/or device is capable of taking an action associated with the color tag. The method further comprises detecting the color tag. The color tag may be detected, for example, on the display or within information being delivered to the display. The method also comprises communicating the attribute or information identifying the attribute to the application and/or device capable of taking an action associated with the color tag.

In accordance with yet another embodiment of the present disclosure, a system operable to facilitate detection of a color tag and taking an action in response to its detection comprises a creator module. The creator module operates to create a color tag including an attribute or information identifying an attribute that will be communicated to an application and/or device. The system also comprises an associator module operable to associate the color tag with an image to be displayed on a display, wherein the color tag will be displayed with or as part of the image on the display. The system in this embodiment further comprises a detector module operable to detect the color tag when it is displayed on the display. In this example, the system also comprises a communicator module operable to communicate information associated with the color tag to an application and/or device capable of taking an action associated with the color tag.

In accordance with still another embodiment of the present disclosure, a computer readable medium comprises a software program operable to execute steps on a processor of a computer comprising creating a color tag comprising an attribute or information identifying an attribute that will be communicated to an application and/or device. In one example embodiment, the application and/or device is capable of taking an action associated with the color tag. The software program is further operable to associate the color tag with an image to be displayed on a display, wherein the color tag will be displayed with or as part of the image on the display.

In accordance with a another embodiment of the present disclosure, a computer readable medium comprises a software program operable to execute steps on a processor of a computer comprising displaying a color tag on a display. In one example, the color tag comprises an attribute or information identifying an attribute that will be communicated to an application and/or device. In particular embodiments, the application and/or device is capable of taking an action associated with the color tag. The software program is further operable to detect the color tag on the display and to communicate the attribute or information identifying the attribute to the application and/or device capable of taking an action associated with the color tag.

Various embodiments of the present disclosure may provide one, some, none, or all of the following technical advantages. Some embodiments may reduce the amount of effort required to give a hardware and/or firmware device or software application the ability to act in response to information being displayed. Various embodiments may reduce or obviate the need for custom hardware or software programming interfaces between software applications, between hardware/firmware devices, between software applications and hardware/firmware devices, and/or between or across different computing platforms. Other embodiments may make it easier to design and/or implement interfaces between hardware and/or software. Various embodiments may reduce the costs associated with enabling interoperability between hardware/firmware devices and software applications across one or multiple computing platforms. Yet another technical advantage of an embodiment is the ability to recognize the content of a display while limiting the effect of the target audience's view of the display. In some cases, a color tag is used which may be significantly smaller than the actual display and/or can be oriented so as to limit its effect on the audience's view of the display.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION OF EXAMPLE EMBODIMENTS

Figure 1:
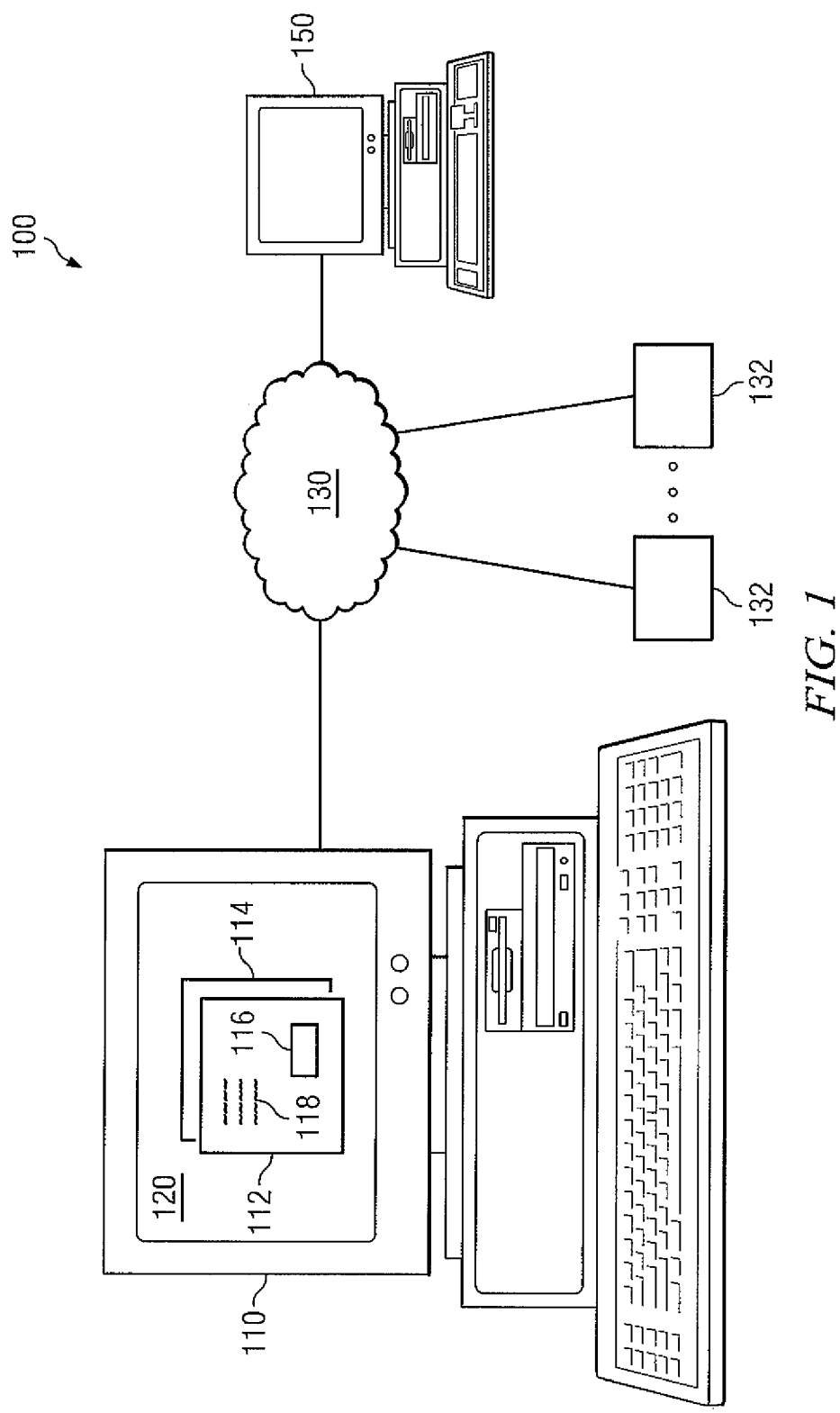
FIG. 1 and FIG. 2 are block diagrams illustrating example embodiments of systems capable of detecting a color tag and engaging functionality in response to that detection, as well as additional components that may interact with such a system.

FIG. 1 is a high level block diagram of a system 100 capable of engaging functionality in response to the detection of a color tag. FIG. 1 illustrates just one example embodiment of system 100. It should be appreciated that other embodiments of system 100 may be used without departing from the scope of the present disclosure.

This embodiment includes a computer 110 with a display 120. The display 120 shows software applications 112 and 114, which are running on computer 110. The window corresponding to application 112 shows content 118 and a color tag 116. The content 118, by way of example, may include a question with multiple answer choices displayed using Microsoft's PowerPoint application. Content 118 could alternatively comprise any information desired to be shown on a display and/or elicit a response from or interaction with a software application, a hardware or firmware element, and/or computing platform. Other non-limiting examples include graphic/tabular content, advertising information, or instructions to a target application.

Continuing the example where content 118 represents a multiple choice question, a color tag 116 may have information associated with content 118 encoded within its specific combination of colors. The information associated with the content 118 that is encoded into the color combination of color tag 116 may comprise the actual question itself, the type of question, the answer to the question, the question difficulty, or other information related to the content.

It should be appreciated that alternative embodiments may encode more or less information into the color tag. For example, some embodiments may encode a descriptor into a portion of the color tag, which identifies the type of information encoded into some or all of the remaining portion of the color tag. In certain embodiments, the information encoded within the color tag may have no particular association with the content (if any) that it is displayed with. As a non-limiting example, a color tag may have only instructions for a target application encoded within its specific combination of colors.

In FIG. 1, a display 120 comprises a plurality of blocks of color. These blocks of color may comprise one or more pixels. Display 120 could be any one of a number of types of displays operable to show image content. These types of displays include computer monitors, hand-held device displays (such as personal digital assistant displays or mobile phone displays), laptop displays, tablet displays, projection devices, and televisions.

System 100 can detect the color tag 116 and use the detected color tag to engage functionality of computer 110 or another computer accessible to system 100. In one embodiment, system 100 detects color tag 116 being displayed on display 120. In another embodiment, system 100 detects color tag 116 by analyzing information being fed to the display, such as the information stream feeding the driver for display 120.

In one embodiment, system 100 may detect color tag 116 on display 120 by scanning display 120 of computer 110. This could be accomplished, for example, by using functionality that accesses an output of a display driver, or alternatively using, for example, a camera to capture a digital version of an image being shown on display 120. The functionality for directing system 100 to scan display 120 and detect color tag 116 may be located on computer 110 itself, hardware and/or firmware devices 132, remote computer 150, or any other hardware or firmware devices or software coupled to network 130. As used throughout this document, the term "couple" and/or "coupled" refers to any direct or indirect communication between two or more elements, whether or not those elements are in physical contact with one another. Network 130 may comprise any wireless network, wireline network, or combination of wireless and wire line networks capable of supporting communication between network elements using ground-based and/or space-based components. For example, network 130 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or a combination of communication systems at one or more locations. In this embodiment, devices 132 and another computer 150 are also coupled to the network 130.

The functionality for scanning and/or analyzing display 120 of computer 110 (or the information to be fed to display 120) may be configurable. As non-limiting examples, the system 100 may operate to scan and/or analyze the full display 120, only the windows corresponding to certain individual applications, only specific portions of windows, or specific portions of the display 120, such as the left upper quadrant of display 120.

Upon detecting color tag 116, system 100 may forward information associated with color tag 116 to, for example, application 114. This information can include all or a part of the information contained in color tag 116. Alternatively, this information could be obtained from another source identified by the contents of color tag 116. It should be appreciated that application 114 needs no knowledge of what is being displayed in the window corresponding to application 112, the type of application that application 112 is, or that application 112 even exists. Application 114 may then take an action associated with color tag 116. These actions may include, for example, displaying all or a part of the information contained in color tag 116 in the window corresponding to application 114. Application 114 could store the information associated with color tag 116 for later use. Application 114 could also engage other applications not shown in the diagram for computer 110. One of ordinary skill in the art will readily appreciate that application 114 could take many other actions than those listed above.

As a further example, in response to detection of color tag 116, the application 114 may engage devices 132 or computer 150 by using network 130. Following the example from above where content 118 comprises a question with multiple choice answers, devices 132 could comprise student response devices. The student response devices could be operable to accept input from a student user indicating their answer choice to the question associated with content 118. Devices 132 may transmit the students' choices across network 130 to application 114 on computer 110. Application 114 may then begin graphing the choices of students on the display 120 as they become available. Devices 132 may also transmit the students' choices to an application on another computer or device coupled to network 130. For example, devices 132 could transmit the information to computer 150, which has software applications capable of taking actions associated with the information transmitted.

In alternative embodiments, system 100 may forward information associated with color tag 116 directly to devices 132 or another computer 150. In these embodiments, application 114 may be an arbitrary software application running on the computer 110 that does not operate to take any action associated with color tag 116. It should be appreciated that computer 150 need not run the same operating system as computer 110. Additionally, computer 150 need not know anything about the nature of application 112. From this, it can be seen that system 100 may enable interoperability between and among different applications running on different operating systems.

Figure 2:
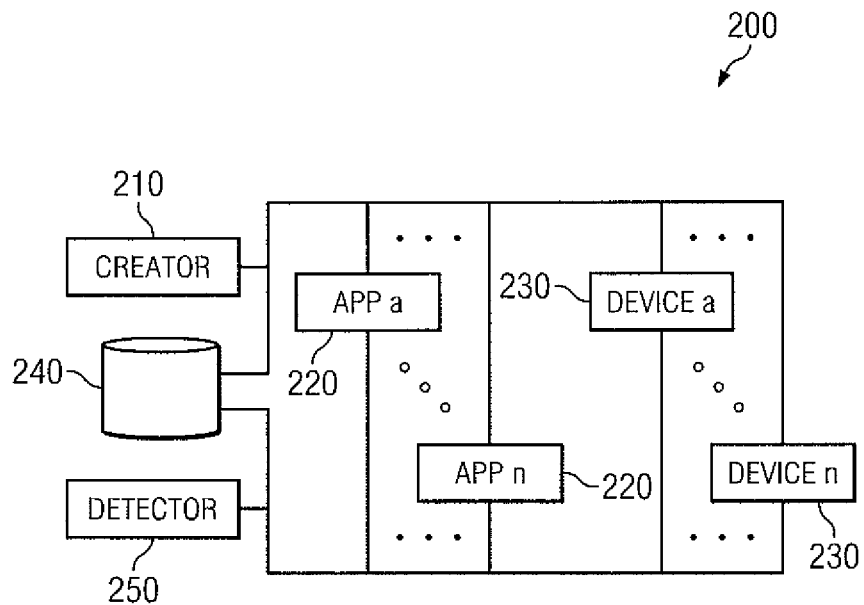

FIG. 2 is a block diagram of an example embodiment of components 200 capable of engaging functionality in response to the detection of a color tag. Components 200 in this embodiment include a creator module 210 coupled to a storage 240, one or more software applications 220 represented by App-a through App-n on FIG. 2, and one or more hardware and/or firmware devices 230 represented by Device-a through Device-n on FIG. 2. In this example, storage 240, software applications 220, and devices 230 are coupled to a detector module 250. Other embodiments may not include all of these elements, may include additional elements, and may have more, fewer, or no elements coupled to storage 240. Storage 240 may comprise any volatile or nonvolatile memory or other device operable to temporarily or permanently hold information useable by components 200. It may comprise, for example, one or more RAMs, ROMs, internal or external hard drives, solid state devices, databases, memory structures, or other software, hardware, firmware or combinations thereof.

The creator 210 is capable of generating a color tag and associating the tag with one or more applications 220 and/or devices 230. The information that the creator encodes into a color tag may come from storage 240 or even one or more of the applications 220 or devices 230 themselves. Alternatively, the information in the color tag could comprise a pointer/identifier to a location in storage 240 or a pointer/identifier to any one or more of applications 220 or devices 230. If desired, the color tag can then be shown on a display 120. In particular embodiments, the color tag may be shown in a window corresponding to one or more of software applications 220.

In one embodiment, detector module 250 is capable, when operating, of obtaining an image on display 120 and analyzing the image to search for and identify a color tag. In another embodiment, detector module 250 is capable, when operating, to analyze information being fed to display 120 (such as, for example, by way of a mirror drive) to identify the presence of a color tag. Detector 250 may then communicate information associated with the detected color tag to, for example, any one or more of applications 220 or devices 230. In certain embodiments, detector 250 may store information associated with the color tag into storage 240.

In FIG. 2, creator 210 and detector 250 are shown as modules separate and independently operable to perform their associated functions. It should be appreciated, however, that the functionality of the creator 210 and the detector 250 could be combined into a single software, firmware, and/or hardware module and could be located separately from or directly within any of applications 210 and/or devices 230. Additionally, whether located within or without applications 210 and/or devices 230, creator 210 and detector 250 can be operable to automatically perform their associated functions without direct commands from a user of the system 100.

In a particular embodiment, creator 210 and detector 250 are configured to be agnostic to the operation of other applications and/or devices with which they may interact. For example, in one embodiment, creator 210 may comprise a software application that can create a color tag for use with any of a number of other software applications and/or hardware or firmware devices, where creator 210 does not require any programming interface to the software or device with which the color tag will be used. As another example, detector 250 may comprise a software application that can detect the presence of a color tag displayed by another application or device, without requiring any programming interface between detector 250 and the software or device displaying the color tag. As non-limiting examples of this functionality, detector 250 may capture all or a portion of the screen image being displayed and perform an analysis of that image to detect the color tag. Alternatively, detector 250 may identify a color tag within information being fed to a display. In either case, particular embodiments of this disclosure allow creation and/or detection of color tags without modifying or interfacing code that operates the applications or devices that display or respond to the color tags. In still other embodiments, creator 210 and/or detector 250 may be programmed as part of, or include an application program interface (API) to an application and/or device that displays and/or responds to a color tag.

Figure 3A:
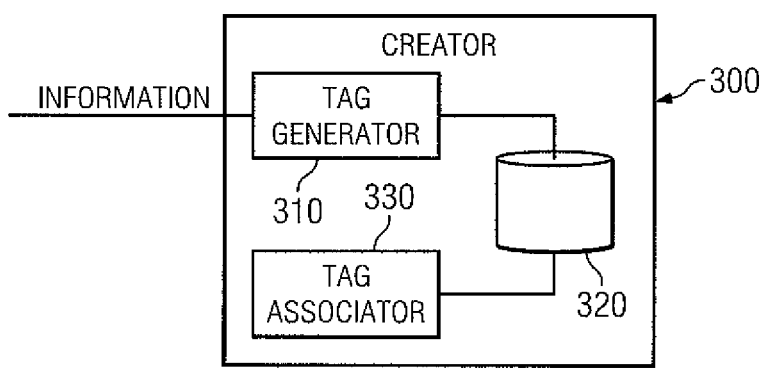
FIG. 3A is a block diagram of a one embodiment of a creator module capable of creating a color tag and associating it with an image on display.

FIG. 3A illustrates a block diagram of one embodiment of a creator module 300 that is capable of creating a color tag and associating it with an image on display. Creator module 300 in this example comprises a tag generator 310, which is coupled to a storage 320, which is in turn coupled to a tag associator 330. In this embodiment, tag generator 310 receives INFORMATION to be encoded into a color tag 316.

Figure 3B:
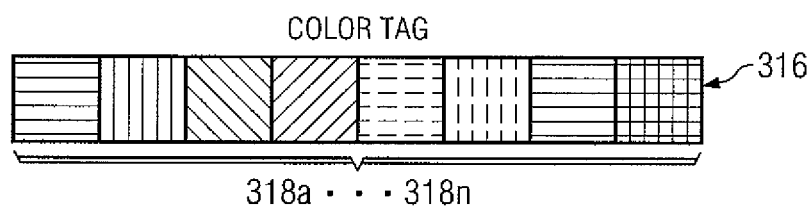
FIG. 3B illustrates an example embodiment of a color tag generated by a tag generator.

FIG. 3B illustrates an example embodiment of a color tag 316 generated by tag generator 310, or generally by a system such as system 100 (FIG. 1). In this example, color tag 316 comprises one or more blocks 318a-318n with each block comprised of one or more colors with each color having associated intensity. In this embodiment, the combination of colors, sometimes referred to as channels, and their associated intensities represent information. At least a portion of blocks 318a-318n have colors with associated intensities that represent INFORMATION. Color tag 316 represented on FIG. 3B has eight blocks 318a-318n. In certain embodiments, each block 318 has a different shading pattern that represents a specific combination of colors and intensities. In an actual system, actual colors may combine to form a block that appears solid in nature. For example, a block could comprise the colors of red, green, and blue of varying intensities to form a color that appears solid in nature. Each block 318 has a value for intensity for each of its associated colors. These values can vary in size depending on the number of bits used to encode them. As non-limiting examples, the values could be any number that can be represented by 16 bits or, alternatively, any number represented by 32 bits.

In the embodiment of color tag 316 represented in FIG. 3, the color tag appears rectangular in nature. However, it should be appreciated that color tag 316 could be generated to appear in various shapes. As non-limiting examples, the blocks in the color tag 316 could be arranged so that it appears as a square or as a circle, or as any other shape or constellation. It should also be appreciated that color tag 316 can be of arbitrary size such that it is configurable to grow to a size necessary to accommodate the amount of information to be encoded within it. Moreover, although color tag 316 is depicted here as having a horizontal orientation, tags in other embodiments could have other orientations.

In order to reduce the possibility of detecting "false positives," which are blocks of an image mis-categorized as a valid color tag, and to reduce corrupt detection, which is reading incorrect information from a valid color tag, certain embodiments of creator 210 may create color tags using special techniques. For example, all or a portion of one or more of the channels of the color tag may be encoded with a special synchronization pattern that is expected by a detector when it is detecting whether a block of an image is part of a color tag. This embodiment may, for example, use the blue channel in the color tag exclusively for the synchronization pattern. The synchronization function employed in the synchronization channel could be, for example, a metronome where the intensity in the color used in the synchronization channel changes in an up and down fashion, with a particular intensity signifying that the content of a color tag has started or stopped. In this example, other channels in the color tag, for example some or all of the red and/or green channels, may then be used to represent other information. Certain embodiments may use more than one channel or less than an entire channel for synchronization information. It should be appreciated that the more channels used for synchronization information the easier it will be to detect a valid color tag. However, less color channels may be available to encode other information INFORMATION.

Certain embodiments of creator 210 may also create color tag 316 where one or more blocks of the color tag comprise a check sum value. As a non-limiting example, the checksum value encoded in a block 318 of color tag 316 may comprise a sum of the values of the intensities used in the non-synchronization channel of the one or more blocks of the color tag. Using a check sum value can reduce the possibility of detecting a color tag where none exists.

Certain embodiments may also limit tag generator 310 to a discreet number of intensities per color channel, rather than using the full range of intensity values available. For example, in an embodiment where the intensity of a color in a block of an image is encoded with 16 bits, tag generator 310 may use only half or a quarter of the full range of possible values. This allows for a higher amount of distortion of the original color value at display time while reducing the chance of losing any of the information encoded within the color channels. This distortion may include noise, scaling, dithering, or any other alterations to the image.

These techniques have been explained in the context of reducing false-positives and corrupt detection. However, one of ordinary skill in the art will recognize other additional advantages of using these techniques.

Referring again to FIG. 3, tag associator 330 is capable, when operating, to associate color tag 316 generated by tag generator 310 with an image to be displayed. Tag associator 330 can accomplish this, for example, by automatically inserting the generated color tag into the image to be displayed. In that case, tag associator 330 could be programmed as part of the application that will display the color tag. As another example, tag associator 330 may place the generated color tag onto an operating system's clipboard. The user of creator 210 may then paste color tag 316 into the window(s) corresponding to one or more software applications. As another example, the tag associator may store a color tag into storage 320 in any number of formats, such as bitmap, jpeg, png, tiff, etc. Then, the user may access the color tag from storage 320 and insert it into an image to be displayed. These two examples provide an advantage of using a tag associator 330 that does not require any programming interface or other modification of software applications and/or devices that will display color tag 316.

Tag associator 330 is not limited in the types of orientations that it may use to insert the color tag into an image. For example, if color tag 316 is rectangular in shape, the tag associator may insert it into the image in a horizontal, vertical or diagonal orientation. Color tag 316 may also be displayed such that is not perceivable by the human eye. This could be achieved, for example, by alternately displaying and removing the color tag in the image displayed, or by formulating the shape of the color tag in a configuration that is not perceivable when displayed. Additionally, the length of time that color tag 316 is displayed could be so short such that it is not perceivable by the human eye but detectable by detector 250.

Figures 4, 5, 6:
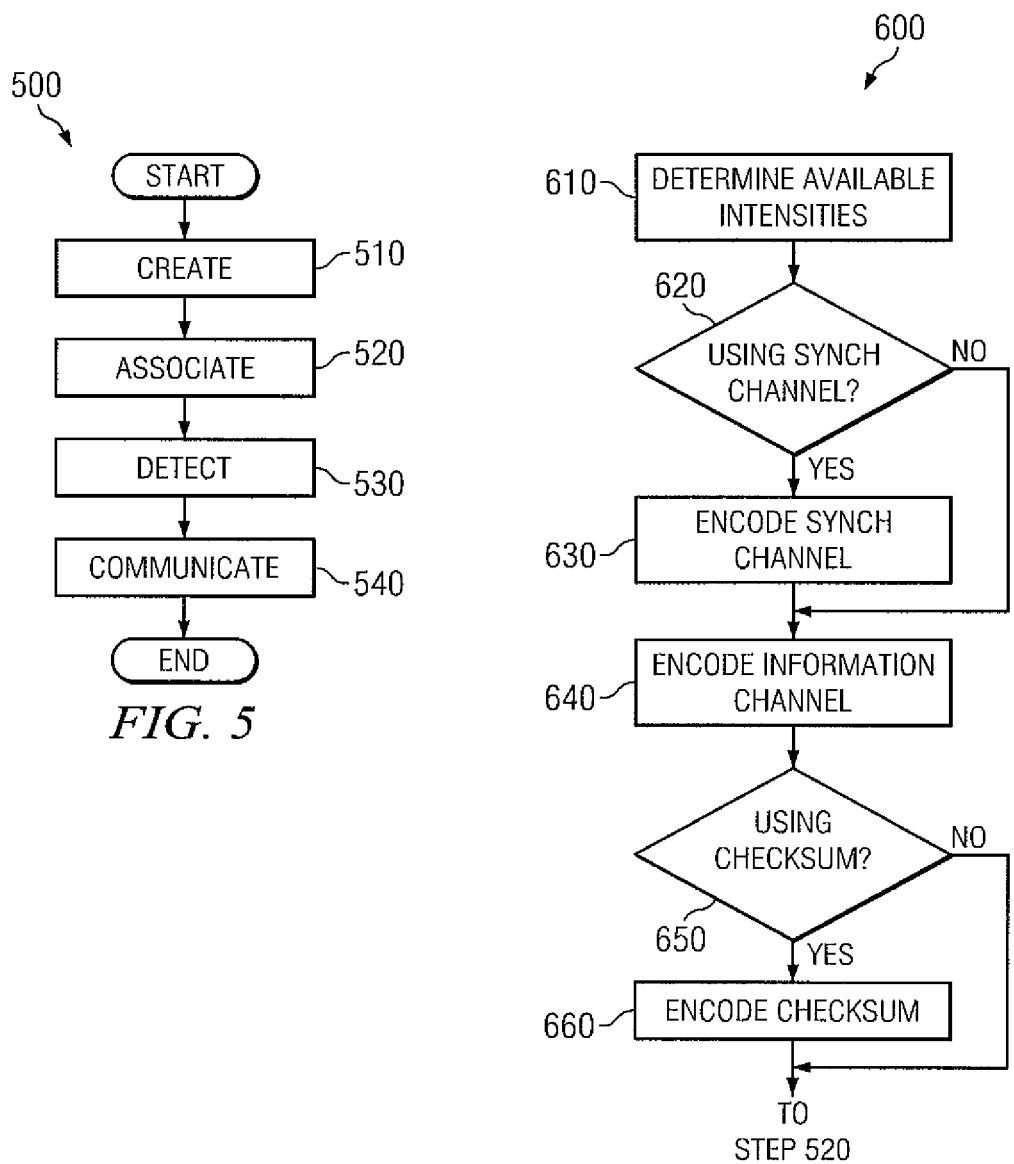
FIG. 4 is a block diagram illustrating an example embodiment of a detector capable of obtaining an image, determining if the image comprises a color tag, and, if so, communicating information associated with the color tag.
FIG. 5 is a flow chart illustrating an exemplary method for engaging functionality using a color tag.
FIG. 6 is a flow chart illustrating an exemplary method for creating a color tag.

FIG. 4 illustrates an example embodiment of a detector 400 capable, when operating, of obtaining an image, determining if the image comprises a color tag, and, if so, communicating information associated with the color tag. It comprises an image obtainer 410 which is operable to obtain an image when it is displayed. It also comprises an image analyzer 420 which is operable to analyze the obtained image to detect a color tag if one exists, extract INFORMATION encoded within the color tag, and communicate INFORMATION to the desired destinations.

Image obtainer 410 may obtain all or a portion of an image being shown or to be shown on a display 120. The image information may be obtained using a screen capture function such as, by way of non-limiting examples, Microsoft's Dot NET API when using detector 400 on a Microsoft Windows or Linux computer system or using a shell command to call the screen capture utility when running on Mac OS X computer system. These utilities allow image obtainer 410 to obtain a screen shot of all or a portion of the image being displayed on display 120. Image obtainer 410 may use this screen capture function periodically to obtain images in order to have them searched for a color tag. For example, image obtainer 410 may use a screen capture function every 1.5 milliseconds. Image obtainer 410 may also receive an image by receiving the output of a digital camera or camcorder. For example, a digital camera may capture an image being displayed by a projector, or by a computer screen and communicate that image, or a processed version thereof to image obtainer 410. Image obtainer 410 may also employ a mirror driver to determine when it will obtain an image to be analyzed. In this embodiment, the operating system acts as if the image obtainer is another display device, such as a monitor, and therefore, forwards pixel information to the image obtainer as if it was a display device. Alternatively, the image obtainer could capture an image in response to a change in all or a portion of an image on a display. This would allow the image obtainer to efficiently determine whether to obtain an image. That is, when there is a possibility of a color tag being on the display rather than periodically obtaining the image on a display when there may have been no change on the image on the display. This embodiment could advantageously preserve system resources.

Image analyzer 420 is operable to analyze the image obtained by image obtainer 410 and search for a color tag. Image analyzer 420 could employ several techniques to determine whether the color tag exists in the obtained image. For example, image analyzer 420 could search for a predetermined pattern of intensities within a synchronization color channel in the image. While searching for the pattern in the color channel, the image analyzer may compare the value of the intensities in this color channel with a predetermined threshold value. Upon finding a sequence of blocks wherein the actual value of the intensity in the color channel exceeds the predetermined threshold value in the synchronization pattern, the image analyzer determines that it has detected a color tag.

In certain embodiments, image analyzer 420 may check for a checksum value in a block of an image that could be part of a color tag. Upon finding the correct value as the checksum, the image analyzer determines that one or more blocks of the image comprise a valid color tag.

While analyzing the values of the intensities in the blocks of the image obtained by image obtainer 410, image analyzer 420 may encounter values that comprise the entire range of intensities available for a color in a block of the image. If during encoding for certain embodiments, the values of the intensities of the colors in the blocks of the color tag were limited to a specific subset of the range of intensities available for a color, the image analyzer may use a mapping algorithm to map the actual values of the intensity of a color to a predetermined value. For example, suppose the values of the intensity of a color channel were limited to multiples of 1000 during color tag creation by the tag generator 310. If tag analyzer 420 encounters an intensity value of zero through 499 in that color channel, it could map the actual value of the intensity to a zero value. It the tag analyzer encounters an intensity value of 500 through 1499, it could map the actual value of the intensity to a value of 1000. It the tag analyzer encounters an intensity value of 1500 through 2499, it could map the actual value of the intensity to a value of 2000, so forth and so on. In this way, the information comprised in the color tag can survive a certain amount of distortion such as dithering, scaling, noise or other alterations/corruption that may occur subsequent to the creation of color tag.

In certain embodiments, imager analyzer 420 may use the predetermined pattern in the synchronization channel to adjust the intensity values in the other channel. After determining that a color tag has indeed been detected, the image analyzer may then adjust the intensity values in the non-synchronization channel by an amount equal or proportional to the difference of the actual value of the intensity in the synchronization channel and the amount it should have been according to the predetermined pattern. This allows these embodiments to tolerate some amount of alteration in the values representing the intensities that can be caused by rendering techniques such as dithering in color interpolation at run time. Image analyzer 420 uses the adjusted values of intensities of the colors in the non-synchronization channels to decode the information represented in the color tag. Image analyzer 420 may then communicate that information as INFORMATION to applications 220, devices 230, and/or storage 240. The applications 220, devices 230, and storage 240 may or may not be able to take an action associated with the color tag. However, they may be able to forward INFORMATION along to applications or devices that are able to take an action associated with the color tag.

FIG. 5 is a flow chart illustrating an exemplary method for engaging functionality using a color tag. In one particular embodiment, a color tag may be created and associated with an image on a display and then detected and used to engage functionality in an software application or hardware/firmware device. Although this example describes the method in the context of the preceding figures, other systems may be used without departing from the scope of the present disclosure.

In this example, method 500 begins at step 510 where a color tag 116 is created and various attributes or information identifying certain attributes are encoded within the blocks of the color tag. FIG. 6 illustrates an exemplary method 600 as one example embodiment of step 510. It includes a step 610, where the intensities available for encoding into a color tag are determined. The number of bits used to represent an intensity, in this embodiment, may determine the full range of possible values that are available. In an embodiment that uses creator 300, tag generator 310 may use the full range of possible values based on the number of available bits or may use only a subset of the full range of possible values. For example, tag generator 310 may use only half or a quarter of the full range of possible values. This subset may be chosen in a way that reduces the chance of detecting the incorrect values during detection of a color tag in an image.

Method 600 also includes a step 620, where it is determined whether one or more of the color channels in the color tag will be used as a synchronization channel. In an embodiment where no synchronization channel is used, the method 600 continues on with its other steps. If a synchronization channel is used, the method continues with a step 630, where at least a portion of one or more channels of a color tag are encoded with a pattern. The patterns encoded into the channels, if there are more than one, may be the same or different. The patterns may be known during detection of the color tag in an image such that they may be identified in a plurality of blocks in an image. The plurality of blocks can then be identified as a color tag. One such pattern is a metronome function, where the pattern repeats in an up and down fashion.

Method 600 also includes a step 640, where attributes or information identifying attributes are encoded into at least a portion of one or more information channels. In this embodiment, the intensities of the colors in a color tag are set such that they represent these attributes or information identifying attributes according to a predetermined mapping function or algorithm. This mapping function or algorithm may be known during detection of the color tag such that a particular combination of colors and intensities may be translated back into the attributes or information identifying attributes. The attributes or information identifying attributes can then be forwarded to the proper destination. In some embodiments, a detector module may forward the raw, un-translated intensity values to another module for later processing. Step 640 may use the values of intensities determined during step 610 such that it may use the full range of possible values according to the number of bits or it may use only a subset of the full range.

Step 640, in certain embodiments, may always use the same number of blocks when creating a color tag. However, this could be inefficient in a case where the attributes or information identifying attributes is not sizeable enough to use all of the blocks in a fixed size color tag. It could also be unduly limiting in a case where the user of a system 100 would like to encode more attributes or information identifying attributes into a color tag than the fixed size of the color tag would allow. To account for these considerations, in certain embodiments, the step 640 may create a block of arbitrary size. These embodiments may include, within the attributes or information identifying attributes, a descriptor which indicates certain information about the remaining attributes such as their type and size. It should be appreciated that other considerations may motivate a method that creates a color tag with an arbitrary number of blocks, such as space availability on the display on which the color tag is to be displayed.

Method 600 also includes a step 650, where the method also determines whether to encode a checksum. If a checksum is not used, the method continues without encoding a checksum value into one or more blocks of the color tag. If a checksum will be used, a step 660 encodes at least a portion of a checksum value into one or more blocks of a color tag. This particular example includes the decision block 650 that determines whether a checksum should be used. Other embodiments may automatically encode checksums for all color tags. The checksum value may be based on the intensity values set in one or more of the color blocks of the color tag. In some embodiments, for example, the checksum may be set to be the least significant digits of the sum of the intensity values of a color in one or more blocks of a color tag. It should be appreciated that this is only one example of a checksum value. One of ordinary skill in the art will recognize many different ways to calculate a checksum value. The method of creating the checksum may be known during detection of the color tag such that it can be used to verify that a valid color tag has been detected.

Referring again to FIG. 5, method 500 also includes a step 520, where a color tag is associated with an image to be displayed. This can be accomplished, for example, by automatically inserting the generated color tag into the image to be displayed. As another example, the color tag may be placed onto an operating system's clipboard. A user of a system employing method 500 may then paste a color tag into the window corresponding to one or more software applications. In an embodiment employing creator 300, tag associator 330 may store a color tag into storage 320 in any number of formats, such as bitmap, jpeg, png, tiff, etc. Then, the user may access the color tag from storage 320 and insert it into an image to be displayed. Note that these two examples provide an way of using method 500 that does not require any programming interface or other modification of software applications and/or devices that will display a color tag.

During step 520, a color tag may be inserted into an image in any of a variety of orientations. For example, if the color tag is rectangular in shape, it may be inserted into the image in a horizontal, vertical or diagonal orientation. The color tag may also be displayed such that is not perceivable by the human eye. This could be achieved, for example, by alternately displaying and removing the color tag in the image displayed, or by formulating the shape of the color tag in a configuration that is not perceivable when displayed. Additionally, the length of time that the color tag is displayed could be so short such that it is not perceivable by the human eye but detectable by detector 250, in an embodiment employing detector 250 to carry out method 500.

Figure 7A:
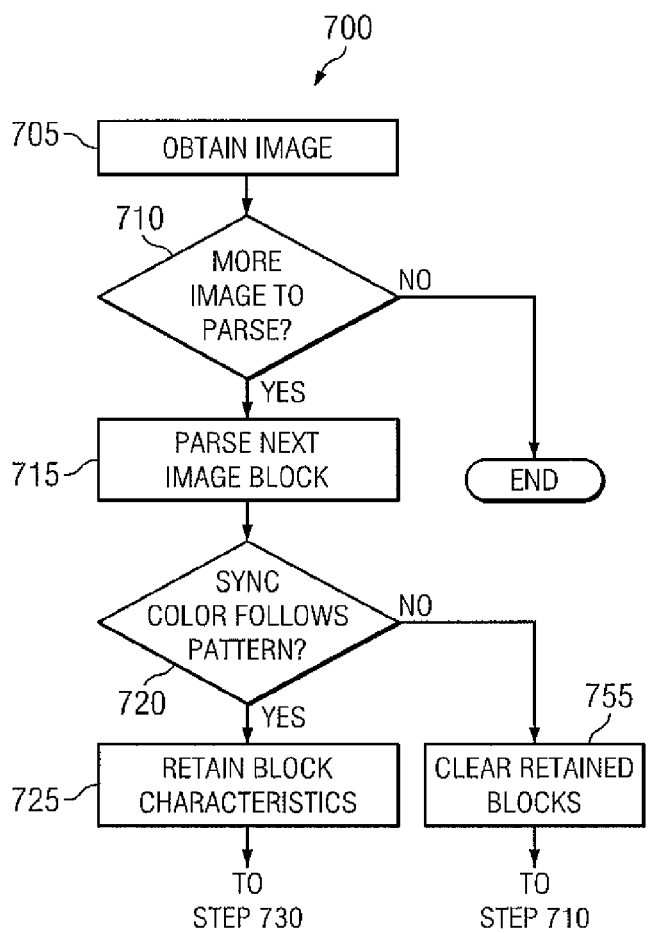
FIG. 7A and FIG. 7B together form a flow chart illustrating an exemplary method for detecting color tag in an image.
Figure 7B:
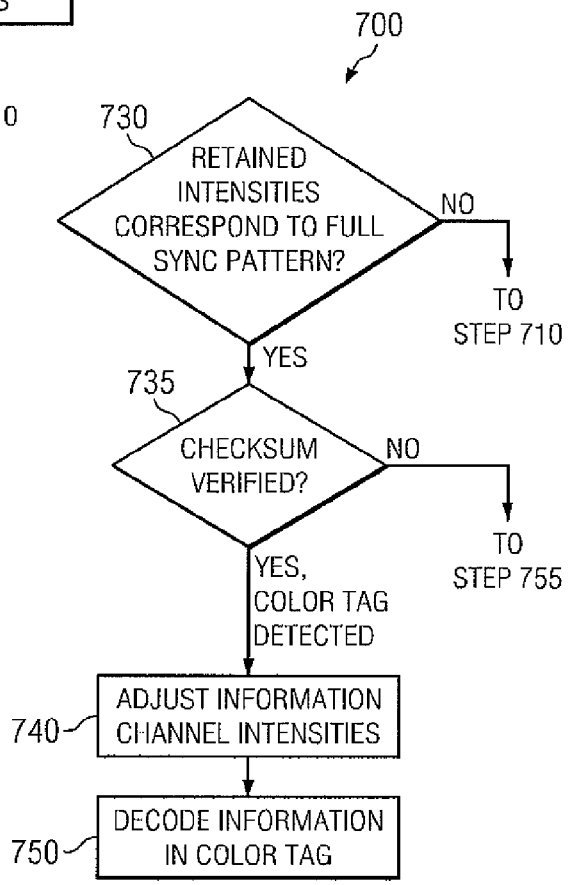

Method 500 also includes a step 530, where a color tag is detected in an image, if a color tag exists in the image. FIGS. 7A and 7B illustrate method 700, which is an exemplary embodiment of step 530. Method 700 includes step 705, where an image is obtained for searching and analysis. In an embodiment employing detector 400, image obtainer 410 may obtain all or a portion of an image being shown or to be shown on a display. Image obtainer 410 may use this screen capture function periodically to obtain images in order to have them searched for a color tag. For example, image obtainer 410 may use a screen capture function every 1.5 milliseconds. The image obtainer 410 may also receive an image by receiving the output of a digital camera or camcorder. The image obtainer 410 may also employ a mirror driver to determine when it will obtain an image to be analyzed. In this embodiment, an operating system acts as if the image obtainer 410 is another display device, such as a monitor, and therefore, forwards pixel information to the image obtainer as if it was a display device. Alternatively, the image obtainer could capture an image in response to a change in all or a portion of an image on a display. This would allow the image obtainer 410 to efficiently determine whether to obtain an image. That is, when there is a possibility of a color tag being on the display rather than periodically obtaining the image on a display with no knowledge of a change to the displayed image. This embodiment could advantageously preserve system resources.

The image obtained in step 705 is parsed, for example, on a block-by-block basis to determine if it contains a color tag. Alternative embodiments may perform this parsing function on multiple blocks at a time. This begins in method 700 at a step 710, where it is determined whether there are more blocks to parse in the image. If there are no more blocks to parse, then the method determines that no color tag existed in the image. If there are more blocks to parse in the image, then the next block in the image is parsed in a step 715. The next block to parse does not necessarily have to be in a fixed position relative to the previously parsed block. For example, in searching for a horizontally-oriented, contiguous, and rectangular color tag the next block to parse may be to the right or left of the previously parsed block. In another example, in searching for a color tag that is configured as a constellation, the next block to parse may be an arbitrary number of blocks away from the previously parsed block (seven blocks to the right and three blocks down, just to name one of many such examples). Method 700 could search for color tags of multiple shapes and orientations automatically or at the discretion of a user.

In a step 720, the method determines whether the value of the intensity in a synchronization channel of a block of the image follows a predetermined pattern. This may involve comparing the actual value of the intensity with a threshold value that is determined based on the predetermined pattern. For example, step 720 could determine that the image block may possibly be a part of a color tag if the value of the intensity in a blue channel (if that channel is used for synchronization) exceeds a threshold value. Certain embodiments may use multiple synchronization channels, in which case, another synchronization channel (red, for example) may be compared to a predetermined pattern that may or may not be the same pattern as that used for the blue channel. Certain embodiments may not use the synchronization pattern throughout all of the blocks of a color tag. In these embodiments, step 720 may not be performed every time a block of an image is parsed.

In this embodiment of method 700, if step 720 determines that the intensity of the color in the block of the image follows the predetermined pattern, the method continues with step 725, where the characteristics of this block of the image are retained. These characteristics may include, as non-limiting examples, the value of the intensity for one or more colors in the block and the location of the of the block in the image. The characteristics of this block are retained because, in this example, this block could possibly be part of a color tag.

In this embodiment, if step 720 determines that the intensity in the synchronization channel does not follow the predetermined pattern, then the method continues with step 755, where characteristics of all previously retained blocks are cleared. The method then goes back to method 710, where it is determined whether there are more blocks to parse in the image.

After retaining the characteristics of a single block in step 725, the method continues with step 730 illustrated in FIG. 7B. Step 730 determines whether the intensities of the colors in the synchronization channel of the retained blocks correspond to the predetermined pattern to determine whether the retained blocks comprise a valid color tag. By way of non-limiting example, this could be done by requiring a match to the full pattern or only a portion of the pattern. If the intensities of the colors in the synchronization channel of the retained blocks do not correspond to the predetermined pattern, the method 700 returns to step 710 where it can determine if there are more blocks in the image to parse. If the intensities of the colors in the synchronization channel do correspond to the predetermined pattern, the method 700 continues with a step 735.

In an embodiment employing a checksum verification, step 735 may determine whether one or more blocks identified by step 730 comprise a valid checksum. If it does not, the method may determine that the retained blocks of the image do not comprise a valid color tag. In such a case, the method continues with step 755 (described above) where the characteristics of the previously-retained blocks are cleared from storage. If step 735 determines that one or more blocks comprise a valid checksum, the method 700 determines that the retained blocks comprise a valid color tag.

The method 700 also includes a step 740, where the intensities of the colors in the non-synchronization channel(s) of the color block are adjusted. One way of doing this would be to determine the difference between the actual value of the intensity of color in a synchronization channel and the value it should have been according to a predetermined pattern. The step 740 could then apply this difference (or an amount proportional to this difference) to the value of the intensities of the colors in the non-synchronization channel(s). The effect may be that the values of the intensities in the non-synchronization channel(s) of the color tag are adjusted to values equal or closer to the values as originally set in, for example, step 510. This technique may help to extract accurate intensity values even after the color tag has been altered subsequent to its creation. As non-limiting examples, this altering could occur through image dithering or enhancement.

The method 700 also includes a step 750, where the specific combination of colors and intensities are translated into at least a portion of an attribute or information identifying attributes. This may be done, for example, with knowledge of the mapping function or algorithm used to encode an attributes or information identifying an attribute during creation of the color tag.

Referring back to FIG. 5, method 500 also includes a step 540, where information associated with the color tag may be communicated to a desired destination. The information associated with the color tag could be any of several items, such as the location of the color tag in the image, the number of blocks in the color tag, and/or at least a portion of an attribute or information identifying an attribute. Certain embodiments may also communicate the raw intensity values and/or the specific colors used in one or more blocks of the color tag. Step 540 may communicate this information to an application and/or device capable of taking action associated with the color tag, such actions may comprise displaying one or more of the attributes on a display, for example.

It should be appreciated that although the steps of the methods described above were discussed in a specific order, the steps do not necessarily have to be performed in that order. For example, the method 600 may perform the step of encoding an information channel before encoding a synchronization channel. Additionally, all of the steps may not be performed in every embodiment of the methods disclosed. For example, the step of verifying a checksum in a color tag does not necessarily have to performed in method 700, even where part of the information encoded into the color tag comprises a checksum.

A module of system performing one or more of the steps recited above may include an interface, logic, memory, and/or other suitable elements. An interface receives input, sends output, processes the input and/or output, and/or performs other suitable operation. An interface may comprise hardware/firmware and/or software. Logic performs the operation of the component, for example, logic executes instructions to generate output from input. Logic may include hardware/firmware, software, and/or other logic. Logic may be encoded in one or more non-transitory tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Although the present invention has been described with several embodiments, a myriad of changes, variations, alterations, and transformations, modifications may be suggested by one skilled in the art. It is intended that the present invention encompass such changes, variations, alterations, transformations, and modifications as falling within the scope of the appended claims.

What is claimed is:

1. A method of creating a color tag and associating the color tag with an image to be displayed, comprising:

creating, by a computer, a color tag comprising a selected one of an attribute and information identifying an attribute that will be communicated to at least one of an application and a device, wherein the at least one of the application and the device is capable of taking an action associated with the color tag, wherein creating the color tag comprises:

creating a plurality of blocks to represent a color tag, each block comprising one or more colors with each color having an associated intensity; and setting the intensity of at least one color of at least one block such that the intensity represents at least part of the selected one of the attribute and the information identifying the attribute;

associating the color tag with an image to be displayed on a display, wherein the color tag will be displayed with or as part of the image on the display.

2. The method of claim 1, wherein the selected one of the attribute and the information identifying an attribute in the color tag comprises information to be used by the at least one of the application and the device capable of taking an action associated with the color tag.

3. The method of claim 1, wherein the selected one of the attribute and the information identifying an attribute in the color tag comprises a pointer to be used by the at least one of the application and the device capable of taking an action associated with the color tag.

4. The method of claim 1, wherein the selected one of the attribute and the information identifying an attribute in the color tag comprises a checksum value.

5. The method of claim 1, wherein each block comprises one or more pixels.

6. The method of claim 1, wherein creating the color tag further comprises setting the intensity of a color of a block in the color tag such that it is associated with a synchronization pattern.

7. The method of claim 1, wherein creating the color tag further comprises using only a subset of the range of intensities available for a color in a block of the color tag.

8. The method of claim 1, wherein the plurality of blocks is of arbitrary size.

9. The method of claim 1, wherein the display comprises a device selected from a group comprising computer monitors, laptop displays, personal digital assistant displays, mobile phone displays, projection devices, and televisions.

10. The method of claim 1, wherein associating the color tag with an image to be displayed on the display comprises inserting the color tag into the image to be displayed.

11. The method of claim 1, wherein associating the color tag with an image to be displayed on the display comprises inserting the color tag into the image to be displayed such that it is not perceivable by a human eye.

12. A method of detecting a color tag and engaging at least one of an application and a device as a result of the detection, comprising:
   displaying a color tag on a display, wherein the color tag comprises a selected one of an attribute and information identifying an attribute that will be communicated to at least one of an application and a device and the color tag comprises a plurality of blocks, each block comprising one or more colors with each color having an associated intensity and the intensity of at least one color of at least one block is set such that the intensity represents at least part of the selected one of the attribute and the information identifying the attribute, wherein the at least one of the application and the device is capable of taking an action associated with the color tag;
   detecting, by a computer, the color tag; and
   communicating the selected one of the attribute and the information identifying the attribute to the at least one of the application and the device capable of taking an action associated with the color tag.

13. The method of claim 12, wherein the color tag is displayed and is not perceivable by a human eye.

14. The method of claim 12, wherein the selected one of the attribute and the information identifying an attribute in the color tag comprises information to be used by the at least one of the application and the device capable of taking an action associated with the color tag.

15. The method of claim 12, wherein the selected one of the attribute and the information identifying an attribute in the color tag comprises a pointer to be used by the at least one of the application and the device capable of taking an action associated with the color tag.

16. The method of claim 12, wherein the selected one of the attribute and the information identifying an attribute in the color tag comprises a checksum value.

17. The method of claim 12, wherein the display comprises a device selected from a group comprising computer monitors, laptop displays, personal digital assistant displays, mobile phone displays, projection devices, and televisions.

18. The method of claim 12, wherein each block comprises one or more pixels.

19. The method of claim 12, wherein detecting the color tag on the display comprises:
   obtaining at least a portion of an image being shown or to be shown on the display, wherein the at least a portion of an image comprises a plurality of blocks, each block comprising one or more colors with each color having an associated intensity; and
   searching the at least a portion of the image for a predetermined combination of at least one of colors and intensities of colors associated with the color tag.

20. The method of claim 19, wherein the at least a portion of the image being shown or to be shown on the display comprises the entire display image.

21. The method of claim 19, wherein the at least a portion of the image being shown or to be shown on the display comprises a portion of the image associated with a particular application.

22. The method of claim 19, wherein the at least a portion of the image being shown or to be shown on the display comprises a predetermined location on the display image.

23. The method of claim 19, wherein obtaining the at least a portion of the image being shown or to be shown on the display comprises using a screen capture function.

24. The method of claim 19, wherein obtaining the at least a portion of the image being shown or to be shown on the display comprises receiving the output of a digital camera.

25. The method of claim 19, wherein obtaining the at least a portion of the image being shown or to be shown on the display comprises receiving pixel information to be sent to the display, before it is sent to the display.

26. The method of claim 19, wherein the at least a portion of the image being shown or to be shown on the display is obtained periodically.

27. The method of claim 19, wherein the at least a portion of the image being shown or to be shown on the display is obtained in response to a change in at least a portion of the image being shown or to be shown on the display.

28. The method of claim 19, wherein detecting the color tag further comprises mapping the actual value of the intensity of a color associated with a block to a predetermined value adjusted to tolerate a distortion level.

29. The method of claim 12, wherein detecting the color tag comprises:
   comparing the intensity of one color associated with a block with a predetermined threshold value; and
   adjusting the intensity of another color associated with that block based on that comparison.

30. The method of claim 12, wherein communicating the selected one of the attribute and the information identifying the attribute to the at least one of the application and the device capable of taking an action associated with the color tag comprises communicating at least part of the selected one of the attribute and the information identifying the attribute in the color tag to a device that communicates with the at least one of the application the device.

31. A system operable to facilitate detection of a color tag on a display and an action being taken in response to its detection, comprising:
   a creator module comprising hardware, the creator module operable to:
      create a color tag comprising a selected one of an attribute and information identifying an attribute that will be communicated to at least one of an application and a device;
      create a plurality of blocks to represent a color tag, each block comprising one or more colors with each color having an associated intensity; and
      set the intensity of at least one color of at least one block such that the intensity represents at least part of the selected one of the attribute and the information identifying the attribute;
   an associator module operable to associate the color tag with an image to be displayed on a display, wherein the color tag will be displayed with or as part of the image on the display;
   a detector module comprising hardware, the detector module operable to detect the color tag when it is displayed on the display; and
   a communicator module operable to communicate information associated with the color tag to the at least one of the application and the device capable of taking an action associated with the color tag.

32. The system of claim 31, wherein the selected one of the attribute and the information identifying an attribute in the color tag comprises information to be used by the at least one of the application and the device capable of taking an action associated with the color tag.

33. The system of claim 31, wherein the selected one of the attribute and the information identifying an attribute in the color tag comprises a pointer to be used by the at least one of the application and the device capable of taking an action associated with the color tag.

34. The system of claim 31, wherein the creator module is operable to set the intensity of a color of a block in the color tag such that it is associated with a synchronization pattern.

35. The system of claim 31, wherein the creator module is operable to use only a subset of the range of intensities available for a color in a block of the color tag.

36. The system of claim 31, wherein the creator module is programmed as an interface to or as part of the at least one of the application and the device capable of taking an action associated with the color tag.

37. The system of claim 31, wherein the creator module is a separate software application that operates independently of the at least one of the application and the device capable of taking an action associated with the color tag.

38. The system of claim 31, wherein the associator module is operable to insert the color tag into the image to be displayed.

39. The system of claim 31, wherein the color tag is not perceivable by a human eye when it is shown on the display.

40. The system of claim 31, wherein the associator module is a separate software application that operates independently of the at least one of the application and the device capable of taking an action associated with the color tag.

41. The system of claim 31, wherein the associator module is operable to automatically associate the color tag with the image to be displayed on the display.

42. The system of claim 31, wherein the detector module is operable to:
    obtain at least a portion of an image being shown or to be shown on the display, wherein the at least a portion of an image comprises a plurality of blocks, each block comprising one or more colors with each color having an associated intensity; and
    search the at least a portion of the image for a predetermined combination of at least one of colors and intensities of colors associated with the color tag, wherein the color tag comprises a plurality of blocks, each block comprising one or more colors with each color having an associated intensity.

43. The system of claim 42, wherein the detector module is further operable to obtain the at least a portion of the image being shown or to be shown on the display periodically.

44. The system of claim 31, wherein the detector module is operable to:
    compare the intensity of one color associated with a block in the color tag with a predetermined threshold value, wherein the color tag comprises a plurality of blocks, each block comprising one or more colors with each color having an associated intensity; and
    adjust the intensity of another color associated with that block based on that comparison.

45. The system of claim 31, wherein the detector module is a separate software application that operates independently of the at least one of the application and the device capable of taking an action associated with the color tag.

46. The system of claim 31, wherein the communicator module is a separate software application that operates independently of the at least one of the application and the device capable of taking an action associated with the color tag.

47. A non-transitory computer readable medium having a software program operable to execute the following steps on a processor of a computer:
    creating a color tag comprising a selected one of an attribute and information identifying an attribute that will be communicated to at least one of an application and a device, wherein at least one of the application and the device is capable of taking an action associated with the color tag, and wherein the step of creating the color tag comprises:
        creating a plurality of blocks to represent a color tag, each block comprising one or more colors with each color having an associated intensity; and
        setting the intensity of at least one color of at least one block such that the intensity represents at least part of the selected one of the attribute and the information identifying the attribute;
    associating the color tag with an image to be displayed on a display, wherein the color tag will be displayed with or as part of the image on the display.

48. The non-transitory computer readable medium of claim 47, wherein the color tag comprises a plurality of blocks and wherein the step of creating the color tag further comprises using only a subset of the range of intensities available for a color in a block of the color tag.

49. The non-transitory computer readable medium of claim 47, wherein the color tag comprises a plurality of blocks and wherein the step of creating the color tag further comprises setting the intensity of a color of a block in the color tag such that it is associated with a synchronization pattern.

50. The non-transitory computer readable medium of claim 47, wherein the step of associating the color tag with an image to be displayed on the display comprises inserting the color tag into the image to be displayed such that it is not perceivable by a human eye.

51. A non-transitory computer readable medium having a software program operable to execute the following steps on a processor of a computer:
    displaying a color tag on a display, wherein the color tag comprises a selected one of an attribute and information identifying an attribute that will be communicated to at least one of an application and a device and the color tag comprises a plurality of blocks, each block comprising one or more colors with each color having an associated intensity and the intensity of at least one color of at least one block is set such that the intensity represents at least part of the selected one of the attribute and the information identifying the attribute, wherein the at least one of the application and the device is capable of taking an action associated with the color tag;
    detecting the color tag on the display; and
    communicating the selected one of the attribute and the information identifying the attribute to the at least one of the application and the device capable of taking an action associated with the color tag.

52. The non-transitory computer readable medium of claim 51, wherein the step of displaying a color tag on a display comprises inserting the color tag into the image to be displayed such that it is not perceivable by a human eye.

53. The non-transitory computer readable medium of claim 51, wherein the selected one of the attribute and the information identifying an attribute in the color tag comprises a pointer to be used by the at least one of the application and the device capable of taking an action associated with the color tag.

54. The non-transitory computer readable medium of claim 51, wherein the color tag comprises a plurality of blocks and wherein the step of detecting the color tag on the display comprises:

obtaining at least a portion of an image being shown or to be shown on the display, wherein the at least a portion of an image comprises a plurality of blocks, each block comprising one or more colors with each color having an associated intensity; and searching the at least a portion of the image for a predetermined combination of at least one of colors and intensities of colors associated with the color tag.

55. The non-transitory computer readable medium of claim 51, wherein the step of detecting the color tag comprises using a screen capture function.

56. The non-transitory computer readable medium of claim 51, wherein the step of detecting the color tag comprises receiving pixel information to be sent to the display, before it is sent to the display.

57. The non-transitory computer readable medium of claim 51, wherein the step of detecting the color tag comprises obtaining at least a portion of the image being shown or to be shown on the display periodically.

58. The non-transitory computer readable medium of claim 51, wherein the step of detecting the color tag comprises:

comparing the intensity of one color associated with a block with a predetermined threshold value; and adjusting the intensity of another color associated with that block based on that comparison.

59. The non-transitory computer readable medium of claim 51, wherein the step of communicating the selected one of the attribute and the information identifying the attribute to the at least one of the application and the device capable of taking an action associated with the color tag comprises communicating at least part of the selected one of the attribute and the information identifying the attribute in the color tag to a device that communicates with the at least one of the application and the device.

* * * * *